United States Patent Office 3,520,279
Patented July 14, 1970

3,520,279
CONTINUOUS VACUUM IMPREGNATOR
Maurice W. Hoover, 3620 Merwin Road,
Raleigh, N.C. 67606
Filed Nov. 16, 1967, Ser. No. 683,624
Int. Cl. B05c 3/10
U.S. Cl. 118—50                                    12 Claims

ABSTRACT OF THE DISCLOSURE

A vacuum chamber in a continuous flow, recirculating, impregnation system. A vortex is formed and maintained by means which deliever the liquid flow to the vacuum chamber in a tangential path, and a helically disposed baffle therein.

---

Figure 1:
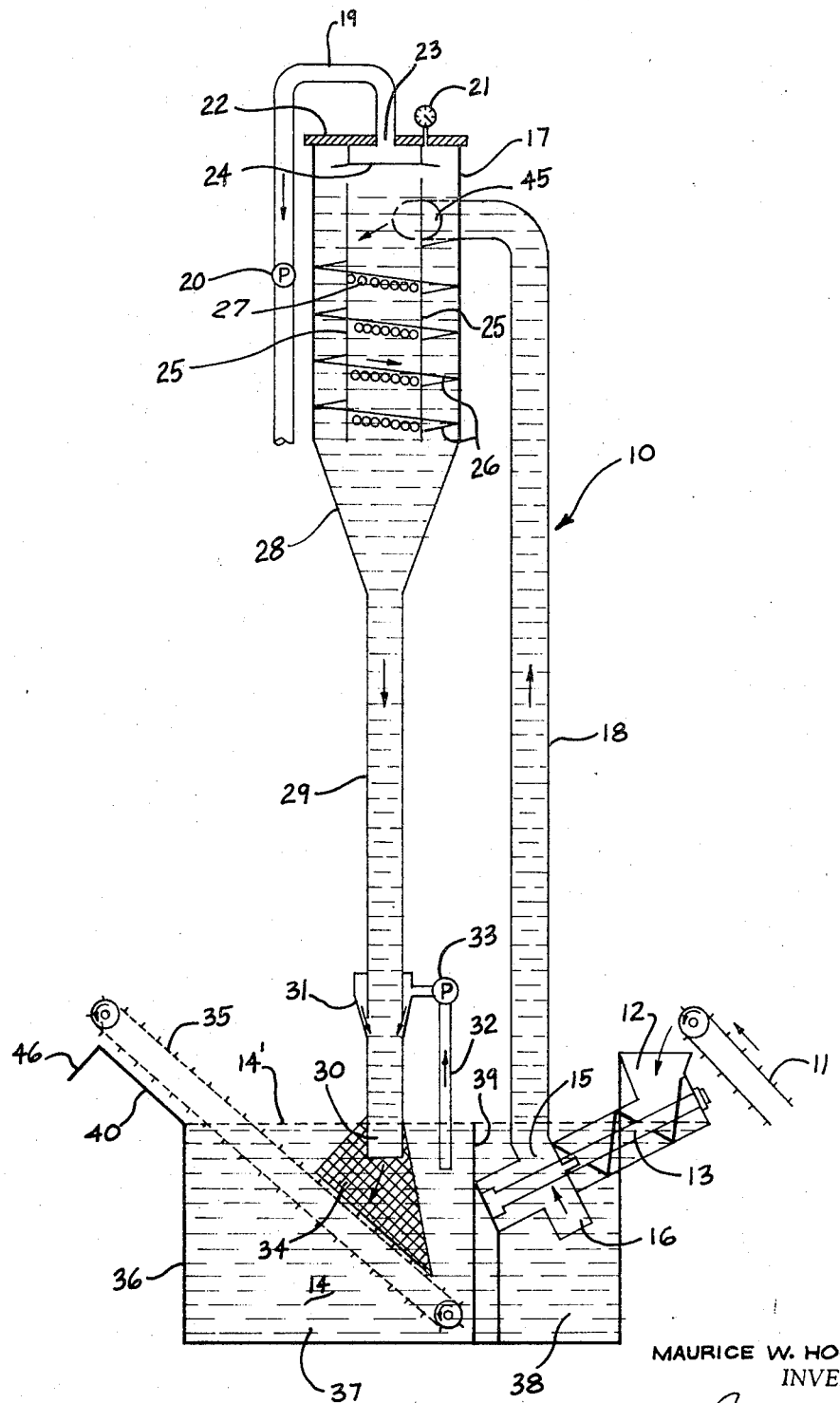

This invention relates to product impregnators and more particularly to improved, vacuum type, continuous flow impregnating systems.

In the past, it has been found desirable to impregnate porous products with preservatives and other types of chemicals. These products include, among other things, fruits, vegetables, plastics, wood products and the like. It has been determined that by placing the product under a vacuum or sub-atmospheric pressure, the gases in the pore spaces of the products are removed so that the thus evacuated products may be impregnated with a liquid. At times this liquid has been used as a carrier for the products as well as for the preservative or treating chemicals.

The batch method has been widely used in various industries wherein the products to be impregnated are placed in a vacuum chamber, sub-atmospheric pressure is applied, followed by the impregnation step. This has been found unsatisfactory at best in that relatively large, expensive equipment must be used to reach the sub-atmospheric pressure for each batch processed as well as requiring a large labor force and a number of controls and signals.

To overcome the above problems and to allow a greater volume of products to be processed, continuous flow systems were developed. These systems included endless conveyors, siphon systems with large pumps to move the fluid from the exhaust side to the intake side for recirculation and sprocket mounted endless chains having the products suspended therefrom. Although these methods had advantages over the batch methods, they have the disadvantages of requiring intricate seal means with the conveying and chain systems and the large, accurately controllable liquid transfer pumps for the siphon systems.

The siphon or liquid carrier, constant flow impregnating systems have an additional disadvantage of maintaining maximum sub-atmospheric pressure for only a relatively short time due to the size of the system involved. Further, high turbulences in the liquid resulting from the high rate of flow in the vicinity of the product input not only may cause damage to such products but also introduces excessive amounts of air into such system.

The present invention has been developed after much research, experimentation and study of the above mentioned problems and is designed to move the product through the entire impregnation process with a minimum of turbulence and agitation of the liquid carrier while at the same time providing a means for maintaining such products in the area of the system having the highest vacuum for an extended period of time to facilitate more efficient removal of gases thus allowing better impregnation of liquids into such products. This is accomplished by providing a novel input system, an enlarged vacuum chamber having a vortex of liquid formed therein to hold the product for a longer period of time in the area of maximum sub-atmospheric pressure, means for moving the carrier liquid through the system by the action of a circumventially disposed hydro-jet located adjacent the outlet end of the system, and means for depositing, conveying and drying the procesed product with a minimum of bruising and agitation.

It is an object, therefore, of the present invention to provide an improved apparatus for effecting, in a continuous operation, the removal of gas from the pore space of products and impregnating such products with a liquid.

Another object of the present invention is to provide means for increasing the temperature of a conveying and impregnating liquid to just below its boiling point when within a vacuum chamber to aid in the impregnation process and add to such process a blanching step.

A further object of the present invention is to provide a means for maintaining a product to be impregnated for a longer period of time in the area of greatest sub-atomspheric pressure to facilitate more efficient removal of gases from such product thereby increasing the amount of liquid penetration.

Another object of the present invention is to provide means to reduce to a minimum the turbulence, agitation and air entrapment in the conveying liquid adjacent the intake of an impregnation system.

Another object of the present invention is to provide a continuous evacuation and impregnation system which does not require, other than gravitational flow, the transfer of liquid from a reservoir adjacent the discharge portion of the system to a reservoir adjacent the intake portion of the system.

Another object of the present invention is to provide a fluid conveyor, sub-atmospheric evacuation and impregnation system wherein it is not necessary for the output tube to be submerged in a liquid reservoir during continuous operation of the system.

Another object of the present invention is to provide a means within the vacuum chamber of an impregnation system to cause a helical pattern of flow of the conveyor liquid which terminates in a vortex.

Other objects and advantages of the present invention will become apparent and obvious from a study of the following description and the accompanying drawings which are merely illustrative of the present invention.

Figure 2:
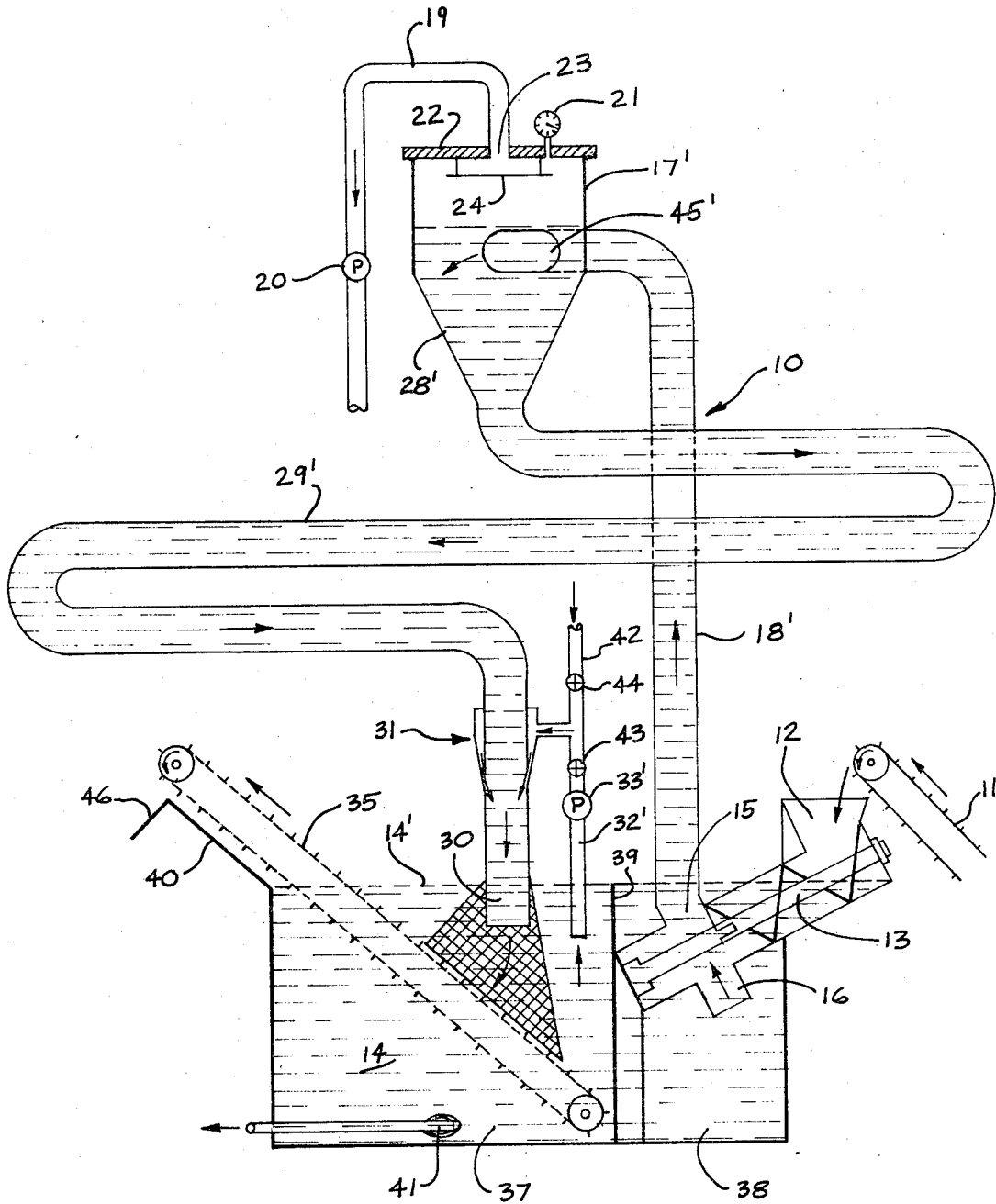

In the drawings:

FIG. 1 discloses, in schematic form, one of the preferred embodiments of the present product impregnation invention; and FIG. 2 discloses, also in schematic form, a modification thereof.

With further reference to the drawings, FIG. 1 discloses a product evacuation and impregnation system indicated generally at 10 including a product conveyor means 11 for continuously feeding the product to be treated into hopper 12.

Hopper 12 communicates with a screw type conveyor 13 which moves the product downwardly below the surface level 14' of the conveying and impregnating liquid 14. The conveyor 13 is rotated by means (not shown)

to continuously feed the product into the chamber area 15 adjacent liquid inlet 16.

Communicatively connected between chamber area 15 and vacuum chamber 17 is inlet tube which enters such chamber tangentially.

Operatively connected through the upper portion of vacuum chamber 17 is a vacuum line 19 which leads to a vacuum pump means 20. Also operatively connected in the upper portion of vacuum chamber 17 is a vacuum gauge indicated at 21.

In spaced relation to the top portion 22 of vacuum chamber 17, and so disposed to shield the exhaust opening 23 of vacuum line 19, is baffle 24.

Fixedly secured within the chamber 17 is a longitudinally disposed open cylinder 25 having a helical baffle 26 fixedly secured between the exterior thereof and the interior wall of such chamber. A series of perforations or apertures 27 penetrate the cylinder 25 in a spiraled fashion just below the helically disposed baffle 26. These openings give a channel through which air may be removed from the path of the liquid and product as will hereinafter become obvious.

The lower portion 28 of chamber 17 tapers conically into discharge tube 29. Near the discharge end of this tube is a conically shaped circumventional collar which communicates with the interior of said discharge tube to form a directional hydro-jet liquid prime mover indicated generally at 31. Through experimentation, it has been found that on the average impregnation system, this prime move should be located within three feet of the discharge opening of tube 29.

Mounted within line 32 which communicates between the liquid 14 and prime mover 31 is pump 33.

Secured to the discharge end 30 of tube 29 is a generally frustroconical shaped perforated shield or screen 34 for guiding the impregnated product from such discharge tube onto endless conveyor 35 as will be hereinafter described.

The liquid used in conjunction with the impregnator of the present invention is contained within tank 36. This tank is dived by weir 39 into a protected inlet liquid reservoir 37 and a discharge liquid reservoir 38.

Projecting upwardly and outwardly parallel to the lower portion of conveyor 35 is drip shield 40 which is adapted to catch and return to reservoir 36 surface liquid which falls from the product.

As will be noted, the modification of the impregnator disclosed in FIG. 2 is similar to the impregnator of FIG. 1 in that the product conveying means, along with the liquid prime mover and tank arrangements are similar. The modification differs from the impregnator hereinabove described in that the inlet tube 18' from tank 36 to vacuum chamber 17' may be shorter in length than tube 18. Vacuum chamber 17' differs from chamber 17 in that the open cylinder 25 and its associated helically disposed baffle 26 are eliminated and the tangential entrance of tube 18 is in the area adjacent to and just above the frustroconical lower chamber section 28'. Due to this configuration, a vortex of liquid will be formed when the liquid within the system is set in motion as will be hereinafter described.

In the modification, discharge tube 29' is lapped back upon itself in a zig-zag fashion to add to the distance the product has to travel during the impregnation portion of the process following evacuation in the vortex.

Through experimentation, it has been found advantageous to raise the temperature of the conveying and impregnating liquid within sub-atmospheric pressure chamber 17' to just below the boiling point. Possible ways of accomplishing this would be to place a heater, such as that indicated at 41, within one or both of the liquid reservoirs. This or these heaters could be either steam, electric or other well known heating means.

To assist the prime mover 31 and at the same time add additional heat to the conveying liquid, a steam line 42 may be connected into line 32' between pump 33' and said prime mover 31.

If both the liquid line 32' and the steam line 42 are used to operate the hydro-jet prime mover 31, the liquid valve 43 and a steam valve 44 should be added as indicated. Obviously by proper manipulation of these valves and the pressure developed by pump 33', prime mover 31 may be operated through the use of pure steam, pure liquid, or a combination of the two depending on the results desired. Obviously compressed air or similar fluids could be introduced into the hydro-jet by connecting a source of such fluid to line 42. Also it would be obvious to add both the heater 41 and the additional source of fluid 42 to the disclosure of FIG. 1 between pump 33 and mover 31.

In actual operation of the impregnator of the present invention, tank 36 is preferably filled so that when the system is functioning, liquid level 14' is just above the top of weir 39. This liquid is to be used as both a conveyor means and impregnating material and may have dissolved therein any chemicals which may be desirable and suitable to have impregnated into the product being processed.

To actually begin operation of the impregnator, vacuum pump 20 is started to lift the liquid 14 upwardly through vacuum chamber inlet and discharge tubes 18 and 29 until it reaches a level within said chamber at or slightly above the top of tangential entrance 45 of tube 18. Vacuum pump 20 is then adjusted to maintain a subatmospheric pressure adequate to hold this level. The amount of vacuum and thus the liquid level may be ascertained by reference to vacuum pressure gauge 21 or equivalent liquid level indicator.

During the operation of the impregnator of the present invention, baffle 24 prevents liquid droplets and other foreign matter from entering the vacuum line 19 by way of vacuum port 23.

The next step in placing the impregnator to actual continuous operation is to activate pump 33 which causes a circumventional hydro-jet flow from prime mover 31 as indicated by the arrows therein. This flow, which may be adjusted by adjusting the pressure produced by pump 33, causes the fluid in tube 29 to move or flow downwardly. This in turn raises liquid from reservoir 38 through tube 18 to replace the liquid lost to such downward flow. As the liquid enters reservoir 37, it raises the level 14' therein and an equal amount of liquid will spill over weir 39 to replenish reservoir 38. As the liquid thus circulates, that entering chamber 17 through tangential port 45 from tube 18 will move downwardly and about the area between open cylinder 25 and the interior walls of said chamber. This sets up a sprial flow which is assured by the helically disposed baffle 26. As the thus circular flow reaches the frustroconical portion 28 of chamber 17, a vortex is formed in the liquid.

Once the liquid 14 has been set in motion as hereinabove described, the particles of the product to be impregnated are placed on conveyor 11 and moved to a point above hopper 12. Such product then enters hopper 12 and is gently conveyed into liquid 14 by screw conveyor 13. The liquid passing through tube 18 enters such tube through inlet 16 which is downwardly disposed in reservoir 38. As the product moves down conveyor 13, it is deposited in chamber area 15 where it is gently picked up by the conveying liquid and moved upwardly through tube 18 as indicated by the arrow. As the individual pieces of the product move upwardly, the atmospheric pressure thereon rapidly changes to sub-atmospheric, reaching its peak as the product enters chamber 17. To maintain this sub-atmospheric pressure as long as possible to allow more efficient removal of air from pore spaces in and pockets around the product, it is held in the chamber for an extended length of time by having to travel in the spiraled path caused by the helically disposed baffle 26 and the vortex set up thereby. As the evacuated product finally enters outlet tube 29, its pores are impregnated with the liquid carrier to replace the air originally therein. The treated product then passes through prime mover 31 with very little turbulence and thus with very little or no damage since the jet flow and the carrier flow are travelling in the same direction.

The liquid and impregnator product are discharged from end 30 of tube 29 into the area surrounded by shield or screen 34. The product then settles, within the confines of said shield or screen onto conveyor 35 which moves such product out of the liquid 14. As it moves, the surface liquid drains from the product down drip shield 40 and back into reservoir 36. After draining the product is deposited on lip 46 for removal to packing, further processing, or other desired areas.

The operation of the modification disclosed in FIG. 2 is similar to that hereinabove described for FIG. 1 except that when the carrying liquid and product enter chamber 17' through tangential entrance 45', the swirling of the liquid forms a vortex in portion 28' which maintains the product within such chamber for a prolonged period of time. When the product exits into tub 29', it has a greater distance to travel prior to reaching outlet 30 than it had from entering reservoir 38 to chamber 17'. This allows a greater length of time in which the evacuated pores may become impregnated with the carrier liquid.

As hereinabove described, when steam from line 42 is used in hydrojet 31, heating of the fluid 14 passing through discharge tube 29 is accomplished. To supplement the heating effect of the steam, heating element 41 is placed in reservoir 37. A second heating element (not shown) could be placed in reservoir 38 to additionally supplement the heating. If found more efficient, element 41 could be eliminated with the addition of the unit in the inlet reservoir. In either case, the heating of the conveyor and impregnation liquid to a point just below the boiling point within vacuum chambers 17 or 17' would give a blanching effect to inactivate the enzymes within the product should such product be a fruit or similar organic substance. Since the vacuum within the chamber draws off surface air pockets as well as evacuates the pores, a much more efficient blanching is accomplished than in the prior art blanching methods.

The modification of FIG. 2 is particularly adapted to the blanching process if the liquid level in the vacuum chamber was closer to the reservoir level than in the device disclosed in FIG. 1. As an example of this, if the liquid level and chamber 17 were 28 feet above the liquid level in tank 36, a vacuum of around 27 inches of mercury would be required and the liquid within such chamber would boil at approximately 125 degrees Fahrenheit. If on the other hand, the liquid level within vacuum chamber 17' is only 7 feet above the liquid level within reservoir 36, a vacuum of about 6.5 inches of mercury would be required to maintain the liquid level within such chamber and the temperature of the carrier and impregnation liquid could be raised to 200 degrees Fahrenheit before reaching the boiling point.

Since it has been noted through extensive research that the higher the temperature of the liquid within which the product is submerged, the more efficiently the product is evacuated and impregnated, the dropping of the subatmospheric pressure such as that disclosed in FIG. 2 modification would not adversely affect the efficiency of the system so long as the conveying and impregnation liquid is maintained at a temperature close to the boiling point.

It is well within the contemplation of the present disclosure that discharge tube 29 could be overlapped as tube 29' to obtain an extended impregnation time. Also the vacuum chambers 17 and 17' of FIGS. 1 and 2 respectively, could be interchanged. Likewise, variations in height to obtain greater or lower boiling points as the result of varying inches of mercury vacuum pressure required to obtain the proper liquid level within the vacuum chamber at varying heights could be made. Also as heretofore indicated, steam, air or other fluids could be introduced into the hydro-jet prime mover 31 of FIG. 1 as described in conjunction with the operation of the prime mover 31 of FIG. 2. Further, should experimentation prove it advantageous to cool the liquid used in the system, cooling coils could be placed in the reservoir as described for heaters 41.

It is obvious that the present invention has the advantage of allowing extended evacuation of poreous products at maximum vacuum while at the same time allowing for extended impregnation of the thus evacuated pores. The present invention also has the advantage of providing a conveyor means used in conjunction with an evacuation and impregnation system which contains a minimum of turbulence throughout the cycle whereby greatly reducing, if not completely eliminating, bruise and agitation damage to the product. The present invention further has the advantage of providing two reservoirs of substantially the same liquid level with a weir between to calm any turbulence caused by the exhaust of the liquid and products prior to such liquids passing into a reservoir adjacent the inlet portion. The present impregnation also has the advantage of eliminating the large pumps and controls necessary with the siphon type impregnation while giving the additional advantage of allowing regulation of rate of flow by regulating the system's prime mover.

The present invention may, of course, be carried out in other specific ways than those herein set forth without departing from the spirit and essential characteristics of the invention. The present embodiments are, therefore, to be considered in all respects illustrative and not restrictive and all changes coming within the meaning and equivalency range of the appended claims are intended to be embraced therein.

What is claimed is:

1. A product hydrating and impregnating apparatus comprising: a liquid containing reservoir; a vacuum chamber disposed at an elevation above said reservoir; means communicatively connecting said reservoir with said chamber whereby liquid and the product carried thereby may be conveyed from said reservoir to said chamber; means for forming a vortex of liquid within said chamber whereby said product may be held at maximum sub-atmospheric pressure for an extended length of time; return means communicatively connecting said chamber with said reservoir whereby said liquid and product may return from said chamber to said reservoir; means for causing the flow of liquid and product from said reservoir, to said chamber, and back to said reservoir whereby said product may be treated; means for introducing the product into the liquid adjacent the lower end of the first recited connecting means between said reservoir and said chamber; the means for forming the vortex within said vacuum chamber is a helically disposed baffle spiraling downwardly within said chamber from the entrance of the connecting means between said reservoir and said chamber; and means for removing the treated product from the reservoir.

2. The apparatus of claim 1 wherein a weir is provided within said reservoir between the area adjacent the means first recited connecting said reservoir and said chamber and the area adjacent the return means connecting said chamber with said reservoir whereby turbulence caused by returning liquid and product will not disturb the even flow of liquid into the first mentioned connecting means.

3. The apparatus of claim 1 wherein the introducing means is a screw type conveyor carrying the product downwardly into the liquid within the reservoir to a point adjacent the entrance to the first recited connecting means between such reservoir and the vacuum chamber.

4. The apparatus of claim 1 wherein the return means connecting said chamber with said reservoir is of a greater length than the means connecting the reservoir to such chamber whereby the impregnation cycle of the system may be extended.

5. The apparatus of claim 1 wherein the removing means is an endless conveyor extending from a point adjacent the lower portion of the return connecting means and extending upwardly to a point exterior of said reservoir.

6. The apparatus of claim 1 wherein the means for causing the flow of the liquid is a hydro-jet type pump operatively connected to the return connecting means adjacent said reservoir.

7. The system of claim 6 wherein the fluid used in the hydro-jet is obtained from said reservoir and is moved by a liquid pump.

8. The system of claim 6 wherein the fluid used in the hydro-jet is steam.

9. The system of claim 6 wherein the fluid used by the hydro-jet is air.

10. The system of claim 6 wherein the fluid used by the hydro-jet is a combination of liquid from said reservoir and steam.

11. The apparatus of claim 1 wherein the liquid within the reservoir is heated to a temperature just below the boiling temperature of such liquid when under sub-atmospheric pressure within said chamber.

12. The apparatus of claim 1 wherein a means is provided for cooling the liquid within the reservoir.

References Cited

UNITED STATES PATENTS

| | | | |
|---|---|---|---|
| 1,160,848 | 11/1915 | Conklin | 23—271 |
| 2,997,373 | 8/1961 | Stephens | 23—272.6 |
| 2,999,538 | 9/1961 | Hullmann | 118—50 X |
| 3,052,209 | 9/1962 | Werther et al. | 118—50 X |
| 3,123,579 | 3/1964 | Lefevre | 118—603 X |
| 3,171,813 | 3/1965 | Ingue. | |
| 3,224,843 | 12/1965 | Morgan et al. | |
| 3,233,579 | 2/1966 | Arvidsson | 118—50 |
| 3,251,337 | 5/1966 | Latto et al. | 118—48 |
| 3,292,573 | 12/1966 | Jones | 118—429 X |
| 3,439,650 | 4/1969 | Stowell | 118—603 X |
| 3,463,267 | 8/1969 | Dooley et al. | 118—50 X |
| 3,476,078 | 11/1969 | King | 118—50 X |

MORRIS KAPLAN, Primary Examiner

118—423, 603